United States Patent [19]

Smith et al.

[11] 4,403,088
[45] Sep. 6, 1983

[54] PLASTIC RESIN PREPARED FROM META OR PARA-DIISOPROPENYLBENZENE AND METHOD OF PREPARATION

[75] Inventors: Robert A. Smith; Dennis B. Patterson, both of Akron, Ohio

[73] Assignee: The Goodyear Tire & Rubber Company, Akron, Ohio

[21] Appl. No.: 405,468

[22] Filed: Aug. 5, 1982

[51] Int. Cl.$^3$ .................... C08G 61/12; C08G 65/00; C08G 85/00

[52] U.S. Cl. .................................................. 528/205

[58] Field of Search .................................. 528/205, 86

[56] References Cited

U.S. PATENT DOCUMENTS 2,687,383  8/1954  D'Alelio ............................. 528/205
3,004,953  10/1961  Sonnabend ......................... 528/205
3,553,290  1/1971  Hunt .................................. 528/205
4,107,144  8/1978  Russell et al. ..................... 528/205
4,357,459  11/1982  Runavot et al. ................... 528/205

Primary Examiner—Lester L. Lee
Attorney, Agent, or Firm—Alvin T. Rockhill

[57] ABSTRACT

This invention relates to a plastic resin composition and the process for making it. This invention discloses a plastic resin comprised of repeat units derived from (1) at least one member selected from the group consisting of meta-diisopropenylbenzene and para-diisopropenylbenzene and (2) at least one member selected from the group consisting of (a) meta-dialkoxybenzene, wherein said alkoxy moieties contain from 1 to 10 carbon atoms, (b) phenol and (c) 1-mercapto-3-alkoxybenzene, wherein said alkoxy moieties contain from 1 to 10 carbon atoms, (d) diaralkoxybenzene, wherein said aralkoxy moieties contain from 7 to 12 carbon atoms and (e) 1,2,3-trialkoxybenzene, wherein said alkoxy moieties contain from 1 to 10 carbon atoms.

18 Claims, No Drawings

PLASTIC RESIN PREPARED FROM META OR PARA-DIISOPROPENYLBENZENE AND METHOD OF PREPARATION

BACKGROUND OF THE INVENTION

Plastics possess a proper combination of chemical, physical, and electrical properties to render them probably the most versatile raw materials available to mankind. Moreover, the plastic deformable state achieved by thermoplastic polymers at elevated temperatures allows them to be shaped into an endless variety of finished products. Finished products of great geometrical complexity can be formed using thermoplastics as the raw material. Plastic resins offer a very great advantage over other raw materials, such as metals, wood, and ceramics, in that they can be easily shaped into useful objects. The shaping of plastic resins into useful articles is relatively quick and is superbly fit for mass production without necessarily sacrificing quality or aesthetics.

Plastic resins are often superior to other materials for use in containers, sealing, toys, pipes, films, component parts, and countless other products. These products are generally formed by employing injection molding, blow molding, or extrusion.

This invention relates to a new polymer that can be employed as a thermoplastic resin. This polymer is synthesized by the copolymerization of meta-diisopropenylbenzene or para-diisopropenylbenzene with certain electron rich aromatic compounds.

The polymerization of diisopropenylbenzene in solution to yield soluble polymers which contain indane groups has been described by Brunner et al. (J. Polymer Sci. 28, 629 (1958). They employed Lewis acid type polymerization catalysts to produce polyindane compositions having softening points of 250° C. and higher. Similarly A. A. D'Onofrio (J. App. Polymer Sci., 8, 521 (1964) has shown that polymerization of diisopropenylbenzene with butyl lithium-titanium tetrachloride-hydrogen chloride catalyst yielded polyindanes with softening points above 268° C. Brunner and Walbridge (Brit. Pat. No. 850,363) show other examples of products obtained from polymerization of diisopropenylbenzene in which the softening points were 222°–230° C., 103°–114° C. and 67°–72° C. The structure of the low softening products was not indicated. U.S. Pat. No. 4,205,160 describes polymers containing units of indane, 1-pentene and 2-pentene structures and which have softening points in the range of from 120° to 200° C., number average molecular weights in the range of 800–2000, and an indane content of from 20 percent to 100 percent.

The cationic hompolymerization of meta-diisopropenylbenzene produces polymers containing predominantly indane structure (polyindanylation). The polymerization occurs by a step-growth process but gels unless the polymerization temperature is kept above 70° C. The gelation is presumed to arise from branches emanating from pendant α-methylstyrene units which were incorporated through 1,2-vinyl propagation.

SUMMARY OF THE INVENTION

This invention discloses a plastic resin comprised of repeat units derived from (1) at least one member selected from the group consisting of meta-diisopropenylbenzene and p-diisopropenylbenzene and (2) at least one member selected from the group consisting of (a) m-dialkoxybenzene, wherein said alkoxy moieties contain from 1 to 10 carbon atoms, (b) phenol and (c) 1-mercapto-3-alkoxybenzene, wherein said alkoxy moieties contain from 1 to 10 carbon atoms, (d) diaralkoxybenzene, wherein said aralkoxy moieties contain from 7 to 12 carbon atoms and (e) 1,2,3-trialkoxybenzene, wherein said alkoxy moieties contain from 1 to 10 carbon atoms. This invention also discloses a process for the synthesis of a plastic resin which comprises polymerizing (1) at least one member selected from the group consisting of m-diisopropenylbenzene and p-diisopropenylbenzene and (2) at least one member selected from the group consisting of (a) m-dialkoxybenzene, wherein said alkoxy moieties contain from 1 to 10 carbon atoms, (b) phenol and (c) (1-mercapto-3-alkoxybenzene, wherein said alkoxy moieties contain from 1 to 10 carbon atoms, (d) diaralkoxybenzene, wherein said aralkoxy moieties contain from 7 to 12 carbon atoms and (e) 1,2,3-trialkoxybenzenes, wherein said alkoxy moieties contain from 1 to 10 carbon atoms in the presence of at least one catalyst selected from the group consisting of Lewis acids and strong Bronsted acids.

The polymers described in this invention are thermoplastics that are useful as injection molding resins. The polymers described in this invention can also be employed as the resin in the manufacture of plastic films.

DETAILED DESCRIPTION

The plastic resins of this invention are prepared by reacting 1,3-diisopropenylbenzene (meta-diisopropenylbenzene), 1,4-diisopropenylbenzene (para-diisopropenylbenzene), and/or mixtures of the meta-diisopropenylbenzene and para-diisopropenylbenzene with certain electron rich aromatic monomers. The electron rich aromatics that can be employed in this copolymerization include meta-dialkoxybenzenes, wherein said alkoxy moieties (groups) contain from 1 to 10 carbon atoms, phenol, and 1-mercapto-3-alkoxybenzene, wherein said alkoxy moieties contain from 1 to 10 carbon atoms, diaralkoxybenzene, wherein said aralkoxy moieties contain from 7 to 12 carbon atoms and 1,2,3-trialkoxybenzenes, wherein said alkoxy moieties contain from 1 to 10 carbon atoms.

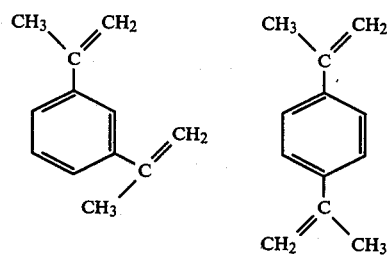

m-diisopropenylbenzene   p-diisopropenylbenzene

It is preferred for the alkoxy moieties in the meta-dialkoxybenzenes, the 1,2,3-trialkoxybenzenes, and the 1-mercapto-3-alkoxybenzenes to contain from 1 to 6 carbon atoms. It is most preferred for the alkoxy moieties in the meta-dialkoxybenzene, the 1,2,3-trialkoxybenzenes, and the 1-mercapto-3-alkoxybenzenes to contain one carbon atom as in meta-dimethoxybenzene.

1-mercapto-3-methoxybenzene, and
1,2,3-trimethoxybenzene

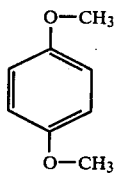
m-dimethoxybenzene

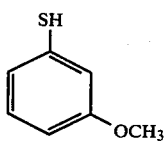
1-mercapto-3-methoxybenzene

The ratio of diisopropylbenzene to meta-dialkoxybenzene, diarylalkoxybenzene, 1,2,3-trialkoxybenzene and/or 1-mercapto-3-methoxybenzene should be in the range from about 1:0.3 to about 1:1, with the most preferred ratio being about 1:1. When phenol is chosen as the electron rich aromatic in the copolymerization of this invention the ratio of diisopropylbenzene to phenol should range between 0.1:1 and 5:1, with the most preferred ratio being from about 1:0.3 to 1:1.

The copolymerization described in this invention can be run in an organic solvent. In some cases it will be desirable to copolymerize the diisopropylbenzene and the electron rich aromatic monomers in bulk (in the absence of solvent). In order to copolymerize in bulk the two monomer components must be miscible in each other. If the two monomer components are not miscible in each other then they must be copolymerized in an organic solvent.

The solvents which are useful in this invention include any hydrocarbons or halogenated hydrocarbons in which the monomer components are soluble. For instance, pentane, heptane, toluene, benzene, methylene chloride, chlorobenzene, chloropentane, dichloromethane, carbon tetrachloride, and mixtures of any of these solvents are an excellent choice as the medium in which to conduct the polymerization described in this invention. Complex mixtures of hydrocarbons, such as kerosene, can also be used very successfully.

The total concentration of monomers in the organic solvent can be as high as 3 molar. Very low concentrations of the monomer components in the organic solvent, for example, about 0.1 molar, can be employed, but the use of very low monomer concentrations will generally not be desirable. As the concentration of the monomer components in the organic solvent increases so does the molecular weight of the polymer synthesized. It will generally be preferred for the monomer charge used in these copolymerizations to contain a concentration of monomer components in the organic solvent of about 2 molar.

In order to effectuate this copolymerization a catalyst must be employed. The catalysts that are useful in this polymerization include Lewis acids and strong Brønsted acids. The strong Brønsted acids that are useful as catalysts in this invention have acidity functions of about 11.0 or greater. A detailed description of acidity functions is given by Colin H. Rochester, *Acidity Functions*, Academic Press, pages 25 and 43 (1970), which is incorporated by reference herein. Some representative examples of catalysts that can be used are chlorosulfonic acid, fluorosulfonic acid, sulfuric acid, trifluoromethanesulfonic acid, titanium tetrachloride, boron trifluoride-diethyl ether complex, and Superfiltrol TM. The most preferred of the Lewis acids is boron trifluoride-diethyl ether complex. The most preferred Brønsted acid is trifluoromethanesulfonic acid.

These catalysts are generally employed at a concentration ranging from about 0.005 molar to about 0.12 molar in the reaction solution. (This catalyst concentration is employed when the polymerization is run in bulk or in an organic solvent). The rate of polymerization increases with increasing catalyst concentrations. At very high catalyst concentrations, for example, 0.1 molar, it will be desirable to add the diisopropylbenzene monomer slowly as the reaction proceeds in order to control the reaction rate. This can be done by adding the diisopropylbenzene dropwise to the reaction solution as the polymerization proceeds. The optimum amount of catalyst that should be used varies greatly with the catalyst itself, the monomers being polymerized, the polymerization temperature and the equipment utilized in the polymerization. One skilled in the art will easily be able to optimize catalysts concentrations to his particular polymerization scheme.

If Superfiltrol TM is the catalyst chosen for the polymerization, the amount employed will vary between about 5 phm (parts per hundred parts monomer) and about 100 phm. The preferred amount of Superfiltrol TM to be employed in such a copolymerization is about 20 to about 50 phm. It may be desirable to employ a combination of two or more of these Lewis acids and strong Brønsted acids in such a polymerizations.

The polymerization of this invention can be run over a very wide temperature range from as low as about 10° C. to as high as about 150° C. It is preferred to utilize a temperature between 25° C. and 80° C. in this polymerization. It is most preferred to run this copolymerization at a temperature of about 40° C. Generally, it will be desirable to agitate the reaction solution during the course of the polymerization. The reaction time needed in order to complete this polymerization will vary greatly with reaction conditions. After the completion of the polymerization the polymer can be precipitated from the reaction mixture with an alcohol, for example, methanol. It can then be dried and used as a thermoplastic resin. These polymers can be melted and pressed into films. These films can be remelted, pressed, and remelted, indicating their thermoplastic nature.

In meta-diisopropylbenzene homopolymerization only paths A and B, shown in the reaction scheme below, are possible for the reactive carbenium ions. Although path A occurs to a much greater extent, path B does produce enough branch points to cause gelation.

REACTION SCHEME

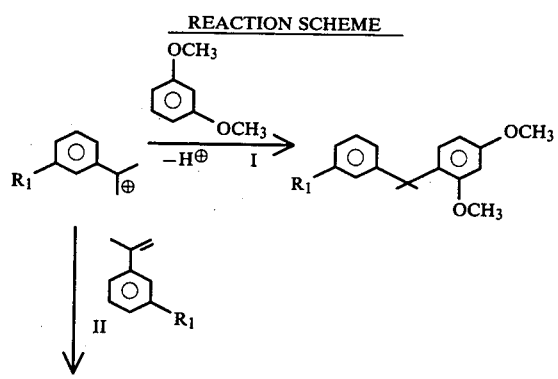

-continued
REACTION SCHEME

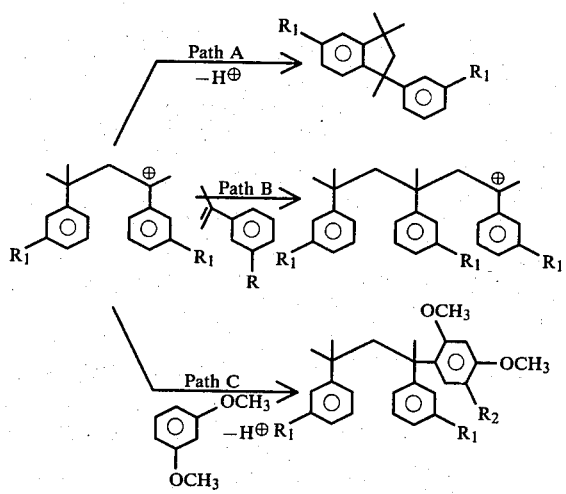

$R_1 = $ ⟩ or polymer chain
$R_2 = H$ or polymer chain

The probability that an active meta-diisopropenylbenzene carbenium ion will grow into a trimer (Path B) in a homopolymerization is very small at ambient temperature since indanylation (Path A) of the dimer is very rapid. However, as mentioned earlier, the small amount of trimer formation that does occur produces points of multiple functionality and causes gelation.

In order to prevent gelation and to produce polymers of high molecular weight containing repeat units derived from meta-diisopropenylbenzene an alkylatable aromatic nuclei can be added to the polymerization as has been previously described. When, for example, meta-dimethoxybenzene is added, additional reactions can occur within the polymerization system-alkylation (Paths I and C). The more reactive the aromatic nucleus the more favorable become Paths I and C relative to the other paths. Thus, a sufficiently reactive aromatic nucleus (meta-dimethyoxybenzene) can suppress either reaction Path II and/or Path B and prevent gelation.

The extent of suppression of Path B depends on the relative concentration of diisopropenylbenzene to the alkylatable aromatic nuclei. When the meta-and/or para-diisopropenylbenzene to alkylatable aromatic nuclei ratio is a minimum virtually no branching occurs and the molecular weight of the polymer produced is a minimum. As the ratio of diisopropenylbenzene to the alkylatable aromatic nuclei is increased some branching does occur and the molecular weight of the polymer produced increases.

The repeat units derived from meta-diisopropenylbenzene and para-diisopropenylbenzene which are incorporated into the polymers of this invention differ from the monomers from which they were derived in that one of their two double bonds is broken in the formation of the polymer chain. The reaction scheme shown above indicates how repeat units derived from meta- and para-diisopropenylbenzene are incorporated into these polymers. Repeat units derived from meta-diisopropenylbenzene which are incorporated into these polymers have the structural formula:

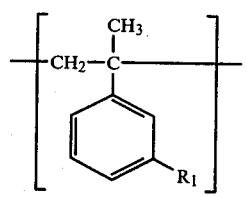

wherein $R_1$ is

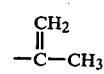

or a polymer chain. Repeat units derived from para-diisopropenylbenzene which are incorporated into these polymers have the structural formula:

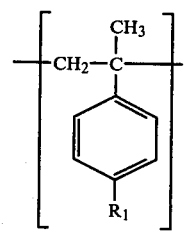

wherein $R_1$ is a

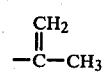

or a polymer chain.

Repeat units derived from meta- or para-diisopropenylbenzene can also be incorporated into various indane structures in the polymer produced, one such indane structure is shown as the product of Path A in the reaction scheme.

The alkylatable aromatic nuclei monomers are incorporated intact into the polymers of this invention. For example, repeat units derived from meta-dimethoxybenzene which are incorporated into the polymers of this invention have the structural formula:

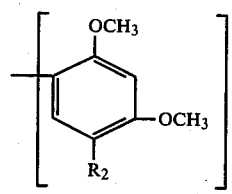

wherein $R_2$ is a hydrogen atom or a polymer chain. In typical diisopropenylbenzene/m-dimethoxybenzene copolymerization from about 10 mole percent to about 50 mole percent of the repeat units in the polymer will be derived from m-dimethoxybenzene.

DESCRIPTION OF THE PREFERRED EMBODIMENTS

These examples are merely for the purpose of illustration and are not to be regarded as limiting the scope of the invention or the manner in which it can be practiced. Unless specifically indicated otherwise parts and percentages are given by weight.

Weight and number average molecular weights were determined on a Waters Associates High Pressure GPC (Gel-permeation chromatograph) using polystyrene equivalents. Microstyragel columns of $10^4$, $10^3$, 500, and 100 Å (Angstroms) were used for the separations. The samples were run as 0.25 weight percent solutions in tetrahydrofuran.

EXAMPLES 1 THROUGH 3

The procedure used in Examples 1 through 3 is as follows: meta-diisopropenylbenzene (m-DIB) was added dropwise to a solution of boron trifluoride diethyl ether complex ($BF_3.OEt_2$) and meta-dimethoxybenzene (m-DMB) in chlorobenzene at 24° C. to make about 200 ml (milliliters) of solution. The molar (M) concentrations of the m-DIB, m-DMB, and $BF_3.OEt_2$ were varied and are indicated in Table I. The polymerization times for Examples 1 through 3 are also given in table I.

TABLE I

| Example | Polymerization Time (Hours) | [m-DMB] | [m-DIB] | [$BF_3.OEt_2$] |
|---|---|---|---|---|
| 1 | 21 | 1.31 M | 0.82 M | 0.037 M |
| 2 | 67 | 1.13 M | 1.47 M | 0.033 M |
| 3 | 91 | 1.10 M | 1.60 M | 0.032 M |

After the indicated polymerization time was completed the mixtures were precipitated in methanol, the methanol insoluble portion was dissolved in methylene chloride, and reprecipitated. The material was reprecipitated four times and dried in a vacuum oven for several days.

The weight average molecular weight ($M_w$), number average molecular weight ($M_n$) and $M_w/M_n$ is given in Table II for the polymers synthesized in Examples 1 through 3.

TABLE II

| Example | $M_w$ | $M_n$ | $M_w/M_n$ |
|---|---|---|---|
| 1 | 2,200 | 1,400 | 1.6 |
| 2 | 2,700 | 1,800 | 1.5 |
| 3 | 3,400 | 2,000 | 1.7 |

EXAMPLES 4 THROUGH 6

In Examples 4 through 6, 0.3 ml of a 22 weight percent solution of $BF_3.OEt_2$ in chlorobenzene was added to a solution of m-DIB (3.0 grams, 18 millimoles) and m-DMB (5.0 grams, 36 millimoles) in 8.4 ml of chlorobenzene in a capped vial. After polymerizing the solutions for two hours in a water bath at 24° C. more m-DIB (3.0 grams, 18 millimoles) was added to the solution. The vials containing the solutions were then placed back in the water bath and the polymerization was continued for the times shown in Table III. The polymers were precipitated and dried as described in Examples 1 through 3. $M_w$, $M_n$, and $M_w/M_n$ are also given in Table III.

TABLE III

| Example | Additional Polymerization Time | $M_w$ | $M_n$ | $M_w/M_n$ |
|---|---|---|---|---|
| 4 | 2.5 hours | 125,000 | 8,500 | 14.7 |
| 5 | 3.0 hours | 303,000 | 10,800 | 28.0 |
| 6 | 5.0 hours | 343,000 | 8,600 | 40.0 |

The additional polymerization times shown in Table III are the reaction times allowed after the second addition of m-DIB. For example, the total polymerization time in Example 5 was 5 hours (2 hours + 3 hours).

As can be determined by reviewing Table III, polymers of very respectable molecular weight can be produced by employing this procedure. The incorporation of repeat units derived from m-DMB in this copolymer has been confirmed by nuclear magnetic resonance spectroscopy (NMR). Spectra were recorded on a Varian Associates A360 60 MHz NMR spectrometer.

EXAMPLES 7 THROUGH 12

The procedure used in Examples 7 through 12 is as follows: 0.019 moles of meta-diisopropenylbenzene and 0.038 moles of meta-dimethoxybenzene were charged to a series of vials in bulk. These mixtures were allowed to polymerize in a constant temperature bath with tumbling at a temperature of 39° C. for a period of two hours. 0.019 millimoles of boron trifluoride-diethyl ether complex were added to catalyze each of these polymerizations. An additional 0.019 moles of meta-diisopropenylbenzene was then added to each of the vials. The vials were returned to the constant temperature bath and tumbled at 39° C. for the period of time specified in Table IV. The polymers were precipitated and dried as specified in Examples 1 through 3 and molecular weights were determined.

TABLE IV

| Example | Additional Polymerization Time | $M_w$ | $M_n$ |
|---|---|---|---|
| 7 | 2.0 hours | 22,000 | 4,500 |
| 8 | 2.5 hours | 122,000 | 8,200 |
| 9 | 3.0 hours | 300,000 | 11,000 |
| 10 | 4.0 hours | 177,000 | 7,500 |
| 11 | 5.0 hours | 340,000 | 8,500 |
| 12 | 21.0 hours | 340,000 | 6,300 |

It would appear that the optimum polymerization time for this particular polymerization system would be a total of about 5 hours (2 hours plus 3 hours after the second addition). A maximum weight average molecular weight of about 340,000 is observed in Examples 11 and 12. A maximum number average molecular weight of 11,000 is observed in Example 9.

EXAMPLES 13 THROUGH 16

A series of solutions of meta-diisopropenylbenzene and phenol in toluene were prepared. These solutions had a concentration of meta-diisopropenylbenzene of 1.96 molar. The concentration of the phenol in these solutions is indicated below in Table V. Boron trifluoride-diethyl ether complex was added to these solutions to a concentration of 0.009 molar. These solutions were polymerized in a constant temperature bath with tumbling at a temperature of 39° C. These solutions were allowed to polymerize for a period of one hour. The polymer synthesized in these examples was precipitated and dried using the procedure specified in Examples 1 through 3. The number average and weight average molecular weights of the polymers synthesized is given below in Table V.

TABLE V

| Example | Phenol Concentration | $M_w$ | $M_n$ |
|---------|---------------------|-------|-------|
| 13 | 1.59 M | 6,600 | 2,600 |
| 14 | 1.33 M | 9,800 | 2,700 |
| 15 | 0.80 M | 11,000 | 2,600 |
| 16 | 0.67 M | 66,000 | 4,500 |

Weight average molecular weight is maximized in Example 16 at 66,000. A ratio of diisopropenylbenzene to phenol of about 3.0 appears to maximize molecular weight.

EXAMPLE 17

The same procedure described in Example 15 was used here except that para-diisopropenylbenzene was substituted for meta-diisopropenylbenzene. The weight average molecular weight of the polymer synthesized was 9,500 and the number average molecular weight of the material was 2,400. This compares very closely to the molecular weights that were obtained using meta-diisopropenylbenzene (see Example 15).

EXAMPLE 18

0.019 moles of meta-diisopropenylbenzene was mixed with 0.038 moles of meta-dimethoxybenzene. Chlorobenzene was added to bring the solution volume to 16.7 ml. 0.95 millimoles of $BF_3.OEt_2$ was added and the vial was placed in a water bath with tumbling at 39° C. for the solution to polymerize. After 2 hours 0.019 moles of additional meta-diisopropenylbenzene was added (20 ml final volume). The vial was polymerized for an additional 4.5 hours (6.5 hours total polymerization time).

The polymer was precipitated and dried using the procedure specified in Examples 1 through 3. A DuPont 990 thermal analyzer (differential scanning calorimeter) was used to determine the glass transition temperature of this polymer after it was heated under vacuum and fused into a glass.

This polymer was also heated and pressed into a film. It was remelted and repressed into another film to indicate the thermoplastic nature of the resin produced. The film produced was transparent.

EXAMPLE 19

0.019 moles of meta-diisopropenylbenzene was mixed with 0.038 moles of meta-dimethoxybenzene. Chlorobenzene was added to bring the solution volume to 16.7 ml. 0.14 millimoles of $CF_3SO_3H$ was added and the vial was placed in a water bath with tumbling at 60° C. for the solution to polymerize. After 2 hours 0.019 moles of additional meta-diisopropenylbenzene was added (20 ml final volume). The vial was polymerized for an additional 3 hours (5 hours total polymerization time). Molecular weight was low ($M_n=800$, $M_w=1300$), however, this was likely due to the high polymerization temperature. The copolymer contained 42 mole percent meta-dimethoxybenzene as determined by NMR spectroscopy.

EXAMPLE 20

The same procedure that was specified in Example 19 was employed here except that Superfiltrol ™ was used as the catalyst at a concentration of 8.7 phm. The number average molecular weight was determined to be 1000 and $M_w$ was determined to be 2300. The copolymer contained 27 mole percent meta-dimethoxybenzene as determined by NMR spectrosopy.

EXAMPLE 21

0.038 moles of meta-diisopropenylbenzene was mixed with 0.038 moles of 1-mercapto-3-methoxybenzene. 7.75 ml of chlorobenzene was added to bring the total solution volume to 20.0 ml. 0.18 millimoles of $BF_3.OEt_2$ was added to the solution and the vial tumbled in a 60° C. polymerization bath for 18 hours. The molecular weight of the material was 500 number average and 1000 weight average. Higher molecular weights could probably be produced at lower polymerization temperatures.

While certain representative embodiments and details have been shown for the purpose of illustrating the invention, it will be apparent to those skilled in this art that various changes and modifications may be made therein without departing from the scope of the invention.

We claim:

1. A plastic resin comprised of repeat unit prepared by reacting (1) at least one member selected from the group consisting of meta-diisopropenylbenzene and p-diisopropenylbenzene and (2) at least one member selected from the group consisting of (a) m-dialkoxybenzene, wherein said alkoxy moieties contain from 1 to 10 carbon atoms, (b) 1-mercapto-3-alkoxybenzene, wherein said alkoxy moieties contain from 1 to 10 carbon atoms, (c) diaralkoxybenzene, wherein said aralkoxy moieties contain from 7 to 12 carbon atoms and (d) 1,2,3-trialkoxybenzene, wherein said alkoxy moieties contain from 1 to 10 carbon atoms.

2. A plastic resin as specified in claim 1 wherein said alkoxy moieties contain from 1 to 6 carbon atoms.

3. A plastic resin as specified in claim 1 wherein said alkoxy moieties contain one carbon atom.

4. A plastic resin as specified in claim 1 wherein said member is selected from the group consisting of (a) meta-dialkoxybenzene, wherein said alkoxy moieties contain from 1 to 10 carbon atoms, (b) 1-mercapto-3-alkoxybenzene, wherein said alkoxy moieties contain from 1 to 10 carbon atoms, (c) diaralkoxybenzene, wherein said aralkoxy moieties contain from 7 to 12 carbon atoms and (d) 1,2,3-trialkoxybenzene, wherein said alkoxy moieties contain from 1 to 10 carbon atoms is meta-dimethoxybenzene.

5. A plastic resin as specified in claim 1 wherein said member is selected from the group consisting of (a) meta-dialkoxybenzene, wherein said alkoxy moieties contain from 1 to 10 carbon atoms, (b) 1-mercapto-3-alkoxybenzene, wherein said alkoxy moieties contain from 1 to 10 carbon atoms, (c) diaralkoxybenzene, wherein said aralkoxy moieties contain from 7 to 12 carbon atoms and (d) 1,2,3-trialkoxybenzene, wherein said alkoxy moieties contain from 1 to 10 carbon atoms is 1-mercapto-3-methoxybenzene.

6. A process for the synthesis of a plastic resin which comprises polymerizing (1) at least one member selected from the group consisting of m-diisopropenylbenzene and p-diisopropenylbenzene and (2) at least one member selected from the group consisting of (a) m-dialkoxybenzene, wherein said alkoxy moieties contain from 1 to 10 carbon atoms, (b) 1-mercapto-3-alkoxybenzene, wherein said alkoxy moieties contain from 1 to 10 carbon atoms, (c) diaralkoxybenzene, wherein said aralkoxy moieties contain from 7 to 12 carbon atoms and (d)

1,2,3-trialkoxybenzenes, wherein said alkoxy moieties contain from 1 to 10 carbon atoms in the presence of at least one catalyst selected from the group consisting of Lewis acids and strong Brønsted acids.

7. A process as specified in claim 6 wherein said alkoxy moieties contain from 1 to 6 carbon atoms.

8. A process as specified in claim 6 wherein said alkoxy moieties contain one carbon atom.

9. A process as specified in claim 6 wherein said member is selected from the group consisting of (a) m-dialkoxybenzene, wherein said alkoxy moieties contain from 1 to 10 carbon atoms, (b) 1-mercapto-3-alkoxybenzene, wherein said alkoxy moieties contain from 1 to 10 carbon atoms, (c) diaralkoxybenzene, wherein said aralkoxy moieties contain from 7 to 12 carbon atoms and (d) 1,2,3-trialkoxybenzene, wherein said alkoxy moieties contain from 1 to 10 carbon atoms is meta-dimethoxybenzene.

10. A process as specified in claim 6 wherein said member is selected from the group consisting of (a) meta-dialkoxybenzene, wherein said alkoxy moieties contain from 1 to 10 carbon atoms, (b) 1-mercapto-3-alkoxybenzene, wherein said alkoxy moieties contain from 1 to 10 carbon atoms, (c) diaralkoxybenzene, wherein said aralkoxy moieties contain from 7 to 12 carbon atoms and (d) 1,2,3-trialkoxybenzene, wherein said alkoxy moieties contain from 1 to 10 carbon atoms is 1-mercapto-3-methoxybenzene.

11. A process as specified in claim 6 wherein the polymerization is run at a temperature between 10° C. and 150° C.

12. A process as specified in claim 11 wherein the polymerization is run at a temperature between 25° C. and 80° C.

13. A process as specified in claim 6 wherein said catalyst is boron trifluoride diethyl ether complex.

14. A process as specified in claim 6 wherein said catalyst is at a concentration from 0.005 molar to 0.12 molar.

15. A process as specified in claim 6 wherein the polymerization is conducted in an organic solvent.

16. A plastic film comprised of a polymer comprised of repeat units prepared by reacting (1) at least one member selected from the group consisting of meta-diisopropenylbenzene and p-diisopropenylbenzene and (2) at least one member selected from the group consisting of (a) m-dialkoxybenzene, wherein said alkoxy moieties contain from 1 to 10 carbon atoms, (b) 1-mercapto-3-alkoxybenzene, wherein said alkoxy moieties contain from 1 to 10 carbon atoms, (c) diaralkoxybenzene, wherein said aralkoxy moieties contain from 7 to 12 carbon atoms and (d) 1,2,3-trialkoxybenzene, wherein said alkoxy moieties contain from 1 to 10 carbon atoms.

17. An injection molded article comprised of a plastic polymer comprised of repeat units prepared by reacting (1) at least one member selected from the group consisting of meta-diisopropenylbenzene and p-diisopropenylbenzene and (2) at least one member selected from the group consisting of (a) m-dialkoxybenzene, wherein said alkoxy moieties contain from 1 to 10 carbon atoms, (b) 1-mercapto-3-alkoxybenzene, wherein said alkoxy moieties contain from 1 to 10 carbon atoms, (c) diaralkoxybenzene, wherein said aralkoxy moieties contain from 7 to 12 carbon atoms and (d) 1,2,3-trialkoxybenzene, wherein said alkoxy moieties contain from 1 to 10 carbon atoms.

18. A process as specified in claim 6, wherein the ratio of said members selected from the group consisting of meta-diisopropenylbenzene and para-diisopropenylbenzene to said members selected from the group consisting of (a) meta-dialkoxybenzene, wherein said alkoxy moieties contain from 1 to 10 carbon atoms, (b) 1-mercapto-3-alkoxybenzene, wherein said alkoxy moieties contain from 1 to 10 carbon atoms, (c) diaralkoxybenzene, wherein said aralkoxy moieties contain from 7 to 12 carbon atoms, and (d) 1,2,3-trialkoxybenzene, wherein said alkoxy moieties contain from 1 to 10 carbon atoms is from about 1:0.3 to about 1:1.

* * * * *